United States Patent Office 2,851,255
Patented Sept. 9, 1958

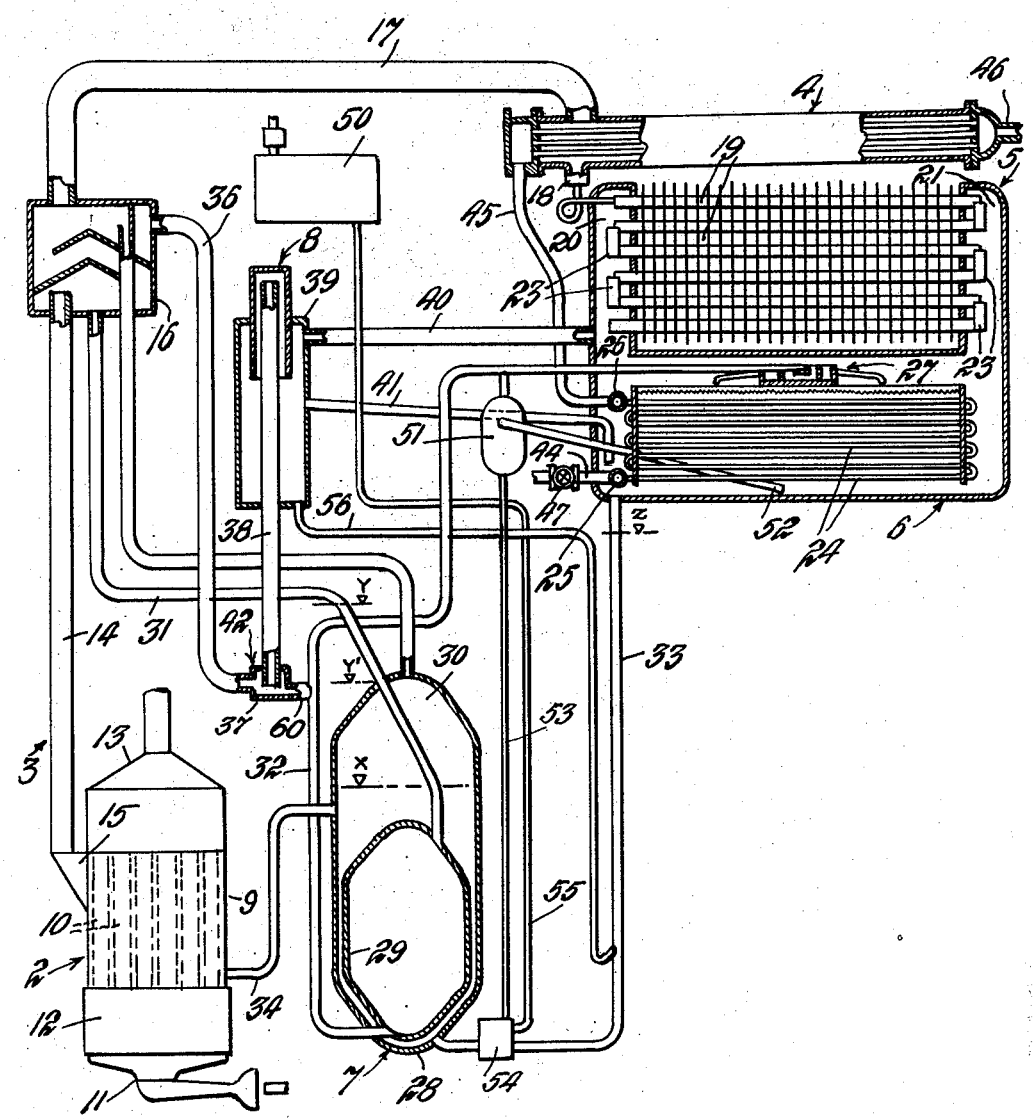

2,851,255

AIR CONDITIONING

Philip P. Anderson, Jr., Evansville, Ind., assignor, by mesne assignments, to Arkla Air Conditioning Corporation, a corporation of Delaware Application May 12, 1955, Serial No. 507,773

2 Claims. (Cl. 257—9)

The present invention relates to heat operated air conditioning apparatus for either heating or cooling and more particularly to improvements in air conditioning apparatus of the type illustrated and described in an application for United States Letters Patent of Norton E. Berry, Serial No. 306,241 filed August 25, 1952, now abandoned.

The air conditioner illustrated in the Berry application operates in a low partial vacuum and contains a water solution of a suitable salt such as lithium bromide. When the air conditioner is operated as a refrigeration system the condenser is cooled and vapor is expelled from absorption solution in the generator by the application of heat. The expelled vapor flows through a refrigerating circuit comprising the generator, condenser and a heat exchange element which operates as a refrigerant evaporator. Simultaneously, solution from which vapor has been expelled is circulated between the generator and absorber through a solution heat exchanger located therebetween. When the air conditioner is operated as a heating system the condenser is not cooled and the expelled vapor flows directly from the generator through a bypass conduit to the heat exchange element which then operates as a heating radiator. The bypass conduit has a liquid trap connected to receive solution weak in refrigerant flowing from the generator to the solution heat exchanger. Thus, solution in the liquid trap provides a barrier in the bypass conduit to prevent the flow of vapor directly to the heat exchanger when the conditionar is operated as a refrigeration system. When the condenser is not cooled, the vapor accumulates in the generator and condenser and depresses the liquid level in the solution circuit below the liquid trap in the bypass conduit to permit vapor to flow therethrough.

The conditioner illustrated and described in the Berry application operates satisfactorily under most operating conditions but under some operating conditions the trap is apt to be unstable. For example, at the start of a cooling cycle if the trap is empty or nearly so, due to previous operation on a heating cycle, it is filled with hot solution which tends to flash. This may result in pumping which tends to continue as more hot solution is fed into the trap. When a preventive control is provided such operation will stop operation of the conditioner. This and other particular operating conditions may produce instability of the liquid trap in the bypass conduit. Also, corrosion inhibitors having limited solubility which decreases with decreasing temperature and increasing concentrations may precipitate in the solution passages of the solution heat exchanger during a cooling operation and remain out of solution in the dormant passages during a heating operation. Furthermore, a noise is apt to be produced in the generator feed line during the initial warmup period of the apparatus when operating as a heating system.

One of the objects of the present invention is to provide an improved construction in a heat operated air conditioner of the type indicated for supplying relatively cool solution to the liquid trap in the bypass conduit to stabilize its operation during cooling cycles.

Another object is to provide an improved construction which permits the flow of relatively hot solution through the passages of the solution heat exchanger during heating cycles to dissolve any corrosion inhibitor which may have precipitated therein during cooling cycles.

Another object is to provide a connection from the liquid trap in the bypass conduit to the solution circuit between the solution heat exchanger and absorber to reduce the noise on initial startup of a heating cycle and provide a greater flexibility in locating the connecting conduit.

Still another object is to provide an air conditioner of the type indicated which is of simple and compact construction, economical to manufacture and reliable in operation.

These and other objects will become more apparent from the following description and drawing. It is to be expressly understood, however, that the drawing is for the purpose of illustration only and not a definition of the limits of the invention, reference being had for this purpose to the appended claims. In the drawing:

The figure is a diagrammatic view of a heat operated air conditioner incorporating the novel features of the present invention and showing the liquid trap in the bypass conduit connected to the solution circuit between the solution heat exchanger and absorber.

The present invention is shown applied to a vacuum type air conditioning apparatus generally similar to that illustrated and described in applications Serial No. 306,241, referred to above. The apparatus comprises a generator 2, vapor liquid-lift 3, condenser 4, heat exchange element 5 for either heating or cooling, an absorber 6, a combined liquid heat exchanger and leveling vessel 7, and bypass conduit 8 interconnected for the circulation of water either as a heating or cooling agent and salt solution at different concentrations.

Generator 2 comprises a vertical boiler in the form of a vessel 9 having tubes 10 extending between tube sheets at the top and bottom thereof. The generator 2 is heated by a suitable burner 11 and the products of combustion are confined by a depending skirt 12 to cause them to flow vertically through the tubes 10 into a dilution flue 13 connected to a suitable stack. Heat from the products of combustion is transmitted through the walls of the tube 10 to the solution in the generator 2 to expel water vapor from the lithium bromide solution.

The vapor liquid-lift 3 is like that described and claimed in Uited States Letters Patent to Norton E. Berry No. 2,625,800 issued January 20, 1953. Suffice it to state herein that the vapor liquid-lift comprises an upright lift tube 14 connected between a chamber 15 at the top and side of the generator 2 and a separating chamber 16. The vapor liquid-lift 3 utilizes vapor expelled in the generator 2 to raise solution into the separating chamber 16.

The top of the separating chamber 16 is connected to the condenser 4 by a vapor conduit 17. Condenser 4 may be of any suitable construction and is shown as a shell and tube type. The bottom of condenser 4 is connected to the heat exchange element 5 through an orifice device 18 like that described and claimed in United States Letters Patent to Norton E. Berry No. 2,563,575 issued August 7, 1951.

Heat exchange element 5 is like that described and claimed in United States Letters Patent to William L. O'Brien No. 2,426,044 issued Aug. 19, 1947. Heat exchange element 5, constituting either an evaporator for cooling or a radiator for heating, comprises a plurality of finned tubes 19 extending between spaced headers 20 and 21. The ends of tubes 19 project into the headers 20 and 21 and cups 23 are provided at opposite ends of adjacent tubes to provide a continuous liquid path through successive tubes from the top to the bottom of the heat exchange element. The lower end of the headers 20 and 21 are mounted on or open into the absorber 6.

Absorber 6 is generally similar to that described and claimed in United States Letters Patent to Albert R. Thomas et al. No. 2,301,232 issued Nov. 10, 1942 and comprises a cylindrical shell closed at opposite ends by the headers 20 and 21. A plurality of serpentine coils 24 are arranged vertically in side-by-side relation in absorber 6 and have their ends connected by headers 25 and 26. Overlying the coils 24 is a liquid distributor 27 adapted to deliver solution onto the uppermost section of each coil which drips from each coil section onto the next lowermost coil section from the top to the bottom of the absorber 6.

The combined liquid heat exchanger and leveling vessel 7 is like that described and claimed in United States Letters Patent to Walter M. Simpson No. 2,685,781 issued Aug. 10, 1954 and comprises an outer casing 28 located below absorber 6 and extending above the generator 2. Casing 28 constitutes the outer passage and a closed casing 29 located within the outer casing constitutes the inner passage of the liquid heat exchanger 7. The inner casing 29 extends upwardly through only a portion of the height of the outer casing 28 to provide a chamber 30 for storing solution between periods of operation and maintaining a substantially constant level of solution acting on the generator during periods of operation.

The solution circuit comprises a path of flow for solution weak in refrigerant from the separating chamber 16 to the absorber 6 and a path of flow for solution strong in refrigerant from the absorber to the generator 2. The path of flow for solution weak in refrigerant comprises a conduit 31 connecting the bottom of the separating chamber 16 to the inner passage 29 of liquid heat exchanger 7 and a conduit 32 connecting the inner passage to the liquid distributor 27 in the absorber 6. The path of flow for solution strong in refrigerant comprises a conduit 33 connecting the bottom of the absorber 6 to the outer passage 28 of the liquid heat exchanger 7 and also constituting a leveling vessel. The side of the casing constituting the outer passage 28 of the liquid heat exchanger 7 is connected to the base of the generator 2 by a conduit 34.

Bypass conduit 8 comprises a pipe 36 connecting the side of the separating chamber 16 to a chamber 37 below the liquid level Y indicated on conduit 31, an auxiliary vapor liquid-lift tube 38 projecting upwardly from chamber 37, a separating chamber 39 at the upper end of the auxiliary vapor liquid-lift and vapor and solution conduits 40 and 41 connecting the separating chamber to the header 20 of the heat exchange element 5 and the absorber 6, respectively. The chamber 37 at the base of the auxiliary vapor liquid-lift 38 is connected to the solution circuit, as later explained in detail, so that the chamber 37 and lower ends of the conduits 36 and 38 are immersed in solution and form a liquid trap 42 in the bypass conduit 8 when the solution stands at the level Y in conduit 36 during operation as a refrigeration system. The solution in trap 42 provides a barrier to prevent the flow of vapor through the bypass 8 and the bypass is opened to permit the flow of vapor therethrough when the solution level is depressed to a level Y' below the lower end of auxiliary lift tube 38.

The closing and opening of bypass 8 is controlled by cooling or not cooling the condenser 4. Absorber 6 and condenser 4 may be cooled by cooling water from any suitable source such as a city water main, cooling tower or the like. Cooling water is delivered to the coils 24 in the absorber 6 through a conduit 44 connected to the header 25. Cooling water flows from the header 26 through a conduit 45 to one end of the condenser 4.

The cooling water flows through the tubes of the condenser 4 and is discharged from the opposite end of the condenser through a conduit 46. A suitable valve 47 is provided in the supply main 44 for controlling the flow of cooling water and thus controlling the operation of the apparatus as a refrigerating system or a heating system. The valve 47 may be controlled manually or thermostatically or by a manually operated means to select either heating or cooling and a thermostatically operated means to regulate the periods of operation. When the condenser 4 is cooled the pressure at the outlet from the generator 2 maintains solution at some level Y to provide a liquid trap in the bypass conduit. When the condenser is not cooled, the pressure at the outlet from the generator 4 depresses the solution to the level Y' or, in other words, blows the trap to open the bypass to the flow of vapor therethrough.

A purging device is also provided for continually withdrawing non-condensable gases from the absorber 6 and delivering the gases to a storage vessel 50. The purging device is like that described and claimed in United States Letters Patent to Charles A. Roswell Re. 23,093 reissued March 22, 1949 and comprises an auxiliary absorber 51 having a suction tube 52 extending to the center and bottom of the absorber 6 where turbulence is at a minimum. A limited quantity of solution weak in refrigerant is delivered from the conduit 32 to the auxiliary absorber 51 where it absorbs refrigerant vapor to produce a relative partial vacuum for withdrawing non-condensable gases from the absorber 6. A fall tube pump 53 depends from the bottom of the auxiliary absorber 51 into a separating chamber 54 in the conduit 33 and an upwardly directed conduit 55 connects the side of the separating chamber to the storage vessel 50. Solution flows from the auxiliary absorber 51 through the fall tube pump 53 and traps non-condensable gases therein which are transferred to the separating chamber 54. Non-condensable gases then flow from the separating chamber 54 through the upright conduit 55 to the storage vessel 50. As thus far described, the apparatus is substantially the same as that described and claimed in my prior application for United States Letters Patent Serial No. 306,241, referred to above.

In accordance with the present invention an improved arrangement of elements is provided for delivering relatively cool solution to the trap 42 in the bypass conduit 8. The improvement comprises a conduit 60 connecting the chamber 37 of the liquid trap 42 in the bypass conduit 8 to conduit 32 between the solution heat exchanger 7 and absorber 6. Thus, solution leaving the solution heat exchanger 7 is supplied to the trap 42 after having passed through the inner passage 29 in heat exchange relation with solution flowing from the absorber 6 to the generator 2. Such solution leaving the solution heat exchanger is relatively cool and below a temperature at which water will flash out of solution and cause pumping in the auxiliary vapor liquid-lift 38 when the conditioner is operated as a refrigeration system. In other words, the improved construction provides a stable trap under all operating conditions during cooling cycles. Also, the conduit 60 connecting the trap 42 in bypass conduit 8 to the conduit 38 beyond the solution heat exchanger 7 from the generator 2 causes hot solution to pass through the passage 29 during heating cycles and dissolve any crystals of a corrosion inhibitor which may have precipitated therein during cooling cycles. Furthermore, the improved construction reduces the noise occurring during the initial warm up period of the conditioner on heating cycles which is believed to be due to an increase in temperature of solution entering the generator as it passes in heat exchange with solution flowing from the generator. It will be noted that the conduit 60 may be connected to the conduit 32 at any location throughout the height of the latter which permits a greater latitude in locating of the conduit than is possible in prior constructions. One form of the invention having now been described in detail, the mode of operation is explained as follows:

When the apparatus is to be operated as a refrigerating system the burner 11 is ignited to heat the generator 2 and the valve 47 is opened to circulate cooling water through the coils 24 of the absorber 6 and the tubes of the condenser 4. Heat supplied to the generator 2 expels refrigerant vapor from absorption solution and the expelled vapor flows upwardly through the vapor liquid-lift tube 14 and raises solution therewith into the separarating chamber 16. The refrigerant vapor then flows through the vapor pipe 17 into the condenser 4 where it is liquefied. Liquid refrigerant flows from condenser 4 through the orifice device 18 into the uppermost tube 19 of the heat exchange element 5. The liquid refrigerant then flows by gravity through successive tubes 19 from the top to the bottom of the heat exchange element 5 constituting a refrigerant evaporator.

Simultaneously, solution weak in refrigerant flows by gravity from the separating chamber 16 to the absorber 6 in a path of flow including the conduit 31, inner passage 29 of liquid heat exchanger 7 and conduit 32 to the liquid distributor 27. The absorption solution weak in refrigerant is distributed by the liquid distributor 27 onto the top of the uppermost tubes of the absorber coils 24 and thereafter drips onto successive tubes from the top to the bottom of the coils to provide an extended surface of relatively cool absorption solution. Refrigerant vapor is absorbed in the relatively cool absorption solution and, due to the high affinity of the absorbent for refrigerant, produces a vapor pressure in the evaporator 5 corresponding to the vapor pressure of the refrigerant in absorbent at the temperature of the absorber. The refrigerant then evaporates in the tubes 19 of the evaporator 5 at a low pressure and temperature to produce a refrigerating effect on air flowing over the exterior of the tubes 19. Absorption solution strong in refrigerant then flows by gravity from the bottom of the absorber 6 back to the generator 2 in a path of flow comprising the conduit 33, outer passage 28 of the liquid heat exchanger 7 and conduit 34.

As soon as refrigerant vapor is absorbed in the absorber 6 a difference in pressure between the generator 2 and absorber 6 is produced corresponding to the vapor pressure of refrigerant at the condenser temperature and vapor pressure of refrigerant in absorbent at the absorber temperature. Such difference in pressure causes pressure balancing liquid columns to form in the conduits 32, 33 and 38. For example, the liquid will stand at some level X in the outer passage 28 of the liquid heat exchanger constituting a leveling vessel, at level Y in conduit 31 connected to conduit 32 through the inner passage 29 of liquid heat exchanger 7 and at level Z in the conduit 33. Thus, the chamber 37 and lower ends of the conduits 36 and 38 will be immersed in relatively cool solution flowing from the solution heat exchanger 7 to the absorber 6. The cool solution will stand at the level Y above the lower end of conduit 38 on the high pressure side and a pressure balancing column of solution will be supported in conduit 38 above the level Y. The solution in the trap 42 provides a barrier in the bypass conduit 8 which prevents the flow of vapor therethrough. Furthermore, the solution in the trap 42 including the pressure balancing column in conduit 38 is below the temperature at which water will flash from the solution at any operating condition during cooling cycles. However, during operation of the conditioner as a refrigeration system some corrosion inhibitor in the solution may precipitate in the passage 29 of the solution heat exchanger.

When the apparatus is to be operated as a heating system the burner 11 is ignited to heat the generator 2 as previously described but the valve 47 is closed to prevent the circulation of cooling water to the condenser 4. Vapor expelled from solution in the generator 2 raises absorbent into the separating chamber 16 as previously explained. The absorbent initially flows through the solution circuit to the absorber 6. The uncondensed vapor, however, accumulates in the condenser 4 and separating chamber 16 and increases the pressure until the liquid in trap 42 is depressed from level Y to level Y' below the bottom of the auxiliary lift tube 38. Vapor from the separating chamber 16 then flows through the bypass conduit 8 in a path of flow comprising the pipe 36, chamber 37, auxiliary lift tube 38, separating chamber 39 and conduit 40 directly into the header 20 of the heat exchange element 5, now constituting a heating radiator. The relatively hot vapor transmits heat through the tubes 19 of the heat exchange element 5 to heat the air flowing over the exterior thereof and the vapor is condensed therein. Hot solution continually flows through the inner passage 29 of the solution heat exchanger 7 during heating cycles to dissolve any crystals of inhibitor which may have been precipitated in the passage. Such solution from the inner passage 29 of the solution heat exchanger 7 flows through the conduit 60 into the chamber 37 and is lifted in the auxiliary vapor liquid-lift 38 by the vapor flowing therethrough into the separating chamber 39. Part of the solution in separating chamber 39 flows by gravity through a restricting conduit 56 to the conduit 33 but the restricting conduit causes the remainder of the solution to back up in the separating chamber 39 and overflow through conduit 41 into the absorber 46 and mix with condensate from the heat exchange element 5. The solution in absorber 6 then flows by gravity back to the generator 2 in a path of flow comprising conduit 33, outer passage 28 of solution heat exchanger 7 and conduit 34. Due to the heat exchange between solution flowing from the absorber 6 to the generator 2 and relatively hot solution flowing from the generator to the absorber during heating cycles, the solution entering the generator is comparatively warm and reduces the noise incident to the initial warm-up period on heating cycles.

It will now be observed that the present invention provides an improved construction in a heat operated air conditioner for supplying relatively cold solution to the liquid trap in the bypass conduit to stabilize its operation during cooling cycles. It will also be observed that the present invention provides for the flow of relatively hot solution through the passage of the heat exchanger during heating cycles to dissolve any inhibitor which may be crystallized therein. It will still further be observed that the present invention provides an improved construction for reducing the noise incident to initial start-up of the conditioner on heating cycles. It will still further be observed that the present invention provides an air conditioner of the type indicated which is of simple and compact construction, economical to manufacture and reliable in operation.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. A heat operated apparatus for either heating or cooling comprising: a generator in which vapor of a volatile liquid is expelled from absorption solution by the application of heat; a liquefier; a heat exchanger element adapted to operate as either a refrigerant evaporator for absorbing heat from its surroundings, or as a heating element for giving up heat to its surroundings; an absorber; conduit means connecting the generator, liquefier and heat exchange element to provide a refrigerant circuit of an absorption refrigeration system; conduit means connecting the generator and absorber to provide a circuit for the circulation of absorption solution; a circuit bypassing said liquefier and connecting the absorption solution circuit with the refrigerant solution circuit for conducting hot gases during heating to the heat exchanger element; a liquid trap in said bypass circuit; a connection to provide absorption solution from said absorption solution circuit to said trap, and means to cool the absorption solution provided to the trap below a temperature whereat the absorption solution in the trap would boil.

2. The structure defined in claim 1 wherein said means to cool the absorption solution includes a solution heat exchanger in the absorption solution circuit, and further wherein said connection connects said trap to receive absorption solution directly from that part of the absorption solution circuit between the solution heat exchanger and the absorber.

References Cited in the file of this patent

UNITED STATES PATENTS

| | | |
|---|---|---|
| 2,557,573 | Sherwood | June 19, 1951 |
| 2,749,095 | Anderson, Jr. et al. | June 5, 1956 |
| 2,761,656 | Spear | Sept. 4, 1956 |